United States Patent
Robbins, III et al.

(10) Patent No.: US 6,422,426 B1
(45) Date of Patent: Jul. 23, 2002

(54) DISPENSING CAP WITH INTERNAL MEASURING CHAMBER

(75) Inventors: Edward S. Robbins, III, 2802 E. Avalon Ave., Muscle Shoals, AL (US) 35661; Ronald White, Florence, AL (US)

(73) Assignee: Edward S. Robbins, III, Muscle Shoals, AL (US)

( * ) Notice: Subject to any disclaimer, the term of this patent is extended or adjusted under 35 U.S.C. 154(b) by 0 days.

(21) Appl. No.: 09/818,493

(22) Filed: Mar. 28, 2001

(51) Int. Cl.[7] .................................................. B67D 5/38
(52) U.S. Cl. ...................... 222/158; 222/456; 222/564
(58) Field of Search ................................ 222/158, 454, 222/564, 456

(56) References Cited

U.S. PATENT DOCUMENTS

| | | |
|---|---|---|
| 1,273,012 A | 7/1918 | Souther |
| 1,714,368 A | 5/1929 | Hobson |
| 1,802,284 A | 4/1931 | Stoddard |
| 2,214,437 A | 9/1940 | Punte et al. |
| 2,339,644 A | 1/1944 | Lucas |
| 2,370,820 A | 3/1945 | Stott |
| 2,449,285 A | 9/1948 | Ekstrom |
| 2,804,103 A | 8/1957 | Wall |
| 2,811,281 A | 10/1957 | Donovan |
| 2,840,124 A | 6/1958 | Greene |
| 2,844,266 A | 7/1958 | Hofe |
| 2,969,167 A | 1/1961 | Libit |
| 2,985,343 A | 5/1961 | Mask |
| 3,020,659 A | 2/1962 | Paulini |
| 3,033,420 A | 5/1962 | Thomas et al. |
| 3,137,418 A * | 6/1964 | Mullen ........................ 222/456 |
| 3,140,799 A | 7/1964 | Mehr |
| 3,424,355 A | 1/1969 | Blumen |
| 3,486,665 A | 12/1969 | La Croce |
| 3,512,861 A | 5/1970 | Schackert |
| 3,784,884 A | 1/1974 | Zoroglu |
| 3,860,111 A | 1/1975 | Thompson |
| 3,948,105 A | 4/1976 | Johnson, Jr. |
| 4,069,935 A | 1/1978 | Hampel |
| 4,079,859 A | 3/1978 | Jennings |
| 4,144,989 A | 3/1979 | Joy |
| 4,164,301 A | 8/1979 | Thayer |
| 4,209,100 A | 6/1980 | Uhlig |
| 4,292,846 A | 10/1981 | Barnett |
| 4,298,038 A | 11/1981 | Jennings |
| 5,411,186 A | 5/1995 | Robbins, III |
| 5,465,871 A | 11/1995 | Robbins, III |
| 5,509,579 A * | 4/1996 | Robbins, III ................ 222/109 |
| 5,509,582 A | 4/1996 | Robbins, III |
| 5,542,579 A | 8/1996 | Robbins, III |
| 5,711,463 A * | 1/1998 | Chen et al. ................. 222/456 |
| 5,873,493 A * | 2/1999 | Robinson .................... 222/109 |

FOREIGN PATENT DOCUMENTS

| | | |
|---|---|---|
| IT | 580339 | 8/1958 |
| IT | 613958 | 12/1960 |

* cited by examiner

*Primary Examiner*—Lesley D. Morris
*Assistant Examiner*—Stephanie Willatt
(74) *Attorney, Agent, or Firm*—Nixon & Vanderhye P.C.

(57) ABSTRACT

A measuring/dispensing cap adapted for attachment to an open upper end of a container, the cap comprising a substantially cylindrical skirt and a lid connected thereto; the cylindrical skirt portion incorporating a measuring chamber defined in part by a weir panel having an opening that is defined in whole or in part by a wall extending upwardly from the panel toward the lid, terminating short of the underside of the lid.

13 Claims, 9 Drawing Sheets

DISPENSING CAP WITH INTERNAL MEASURING CHAMBER

BACKGROUND AND SUMMARY OF THE INVENTION

The present invention relates generally to dispensing containers and, more specifically, to dispensing cap constructions enabling accurately measured amounts of the container contents (in granular, particulate or powdered form) to be dispensed from the cap.

Dispensing containers are, of course, well known and are used in many different industries for many different purposes. One such use is in the food industry, and a specific example includes jars and other similar containers which contain solid foods (such as spices) in particulate, granular or powder-like form. Typically, a measuring spoon or separate measuring cup is utilized in conjunction with the jar or container when accurate amounts are to be obtained.

Commonly owned U.S. Pat. No. 5,509,582 discloses dispensing caps incorporating measuring chambers that eliminate the need for measuring spoons or cups. While the incorporation of a measuring function into a container/cap construction for the discharge of desired amounts of the container contents is not in itself new (see for example, U.S. Pat. Nos. 1,802,284; 2,804,103; 3,860,111; 4,613,057 and 4,635,828), the dispensing caps in the above identified commonly owned patent provides improved and simplified structures for accomplishing this result, while generally retaining the desirable option of substantially unrestricted pouring and/or shaking of the container contents from the dispensing cap.

This invention improves the prior dispensing caps by adding back flow impedance features that minimize the risk of measured amounts of the container contents accidentally transferring from the measuring chamber in the cap back into the container before the measured amount is dispensed from the cap.

In one exemplary embodiment of the invention, a transparent plastic cap is provided which includes a top and a depending skirt. The skirt incorporates a generally bowl-shaped weir panel provided with a weir aperture lying on one side of a center line extending through the cap. The weir panel, in combination with the skirt wall and the cap top wall, form a measuring chamber into which a desired amount of container contents may be poured via the weir aperture. In this exemplary embodiment, a vertical wall is provided along the weir edge, thus providing a barrier to accidental backflow. The cap top wall forms a fully openable dispensing door integrally hinged at the juncture of the cap skirt and cap top wall. The cap top wall (and optionally a portion of the depending skirt) is provided with volume gradations in the form of level lines and suitable alpha and/or numeric characters, enabling the user to precisely transfer measured amounts of contents from the container into the cap measuring chamber.

In a second exemplary embodiment, the weir edge extends only partly across the cap chamber, resulting in a generally rectangular shaped weir aperture. In this embodiment, the backflow prevention wall is configured like the aperture, with a forward wall and two side walls extending upwardly from the weir aperture.

In a third exemplary embodiment, the bowl-shaped weir panel extends over the entirety of the cap interior. Contents are moved into the cap measuring chamber through a round aperture in the panel, and backflow is prevented by a substantially upright sleeve extending upwardly from the aperture.

While three weir aperture configurations are described herein, it will be appreciated that the backflow prevention technique disclosed herein is readily adaptable to any number of weir aperture shapes.

Accordingly, in one aspect, the present invention relates to a measuring/dispensing cap adapted for attachment to an open upper end of a container, the cap comprising a substantially cylindrical skirt and a lid connected thereto; the cylindrical skirt portion incorporating a measuring chamber defined in part by a weir panel having an opening that is defined in whole or in part by a wall extending upwardly from the panel toward the lid, terminating short of the underside of the lid.

In another aspect, the invention relates to a measuring/dispensing cap adapted for attachment to an open upper end of a container, the cap comprising a substantially cylindrical skirt and a lid integrally hinged to the cap; the cylindrical skirt incorporating a measuring chamber defined in part by a generally bowl-shaped weir panel having an opening that is defined in whole or in part by a wall extending upwardly from the panel, terminating short of the underside of the lid; wherein at least the lid is composed of substantially transparent plastic; and wherein the lid is provided with volume indicators.

Other objects and advantages of the invention will become apparent from the detailed description which follows.

DETAILED DESCRIPTION OF THE DRAWINGS

Figure 1:
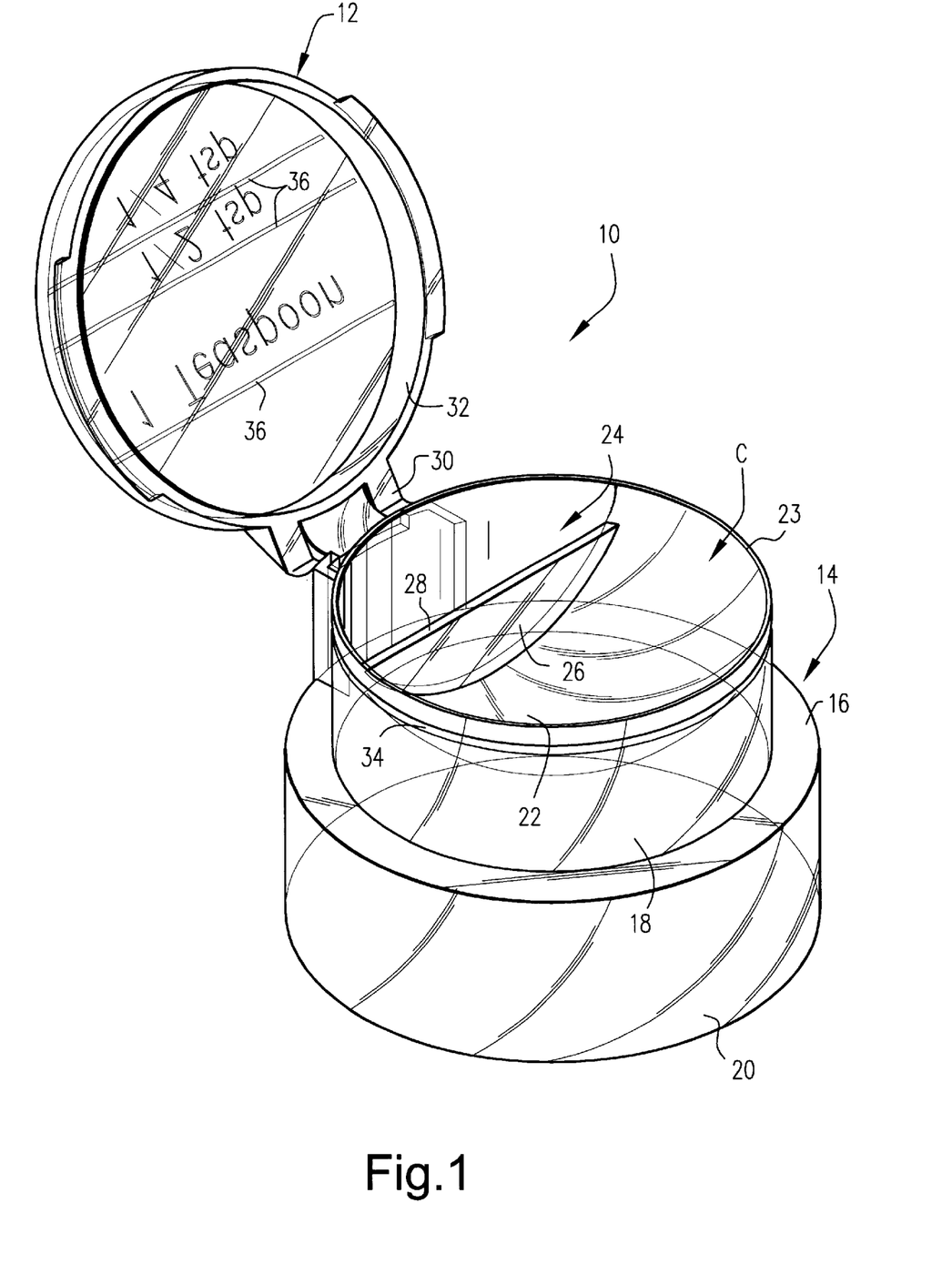
FIG. 1 is a perspective view of a dispensing cap in accordance with this invention.
Figure 2:
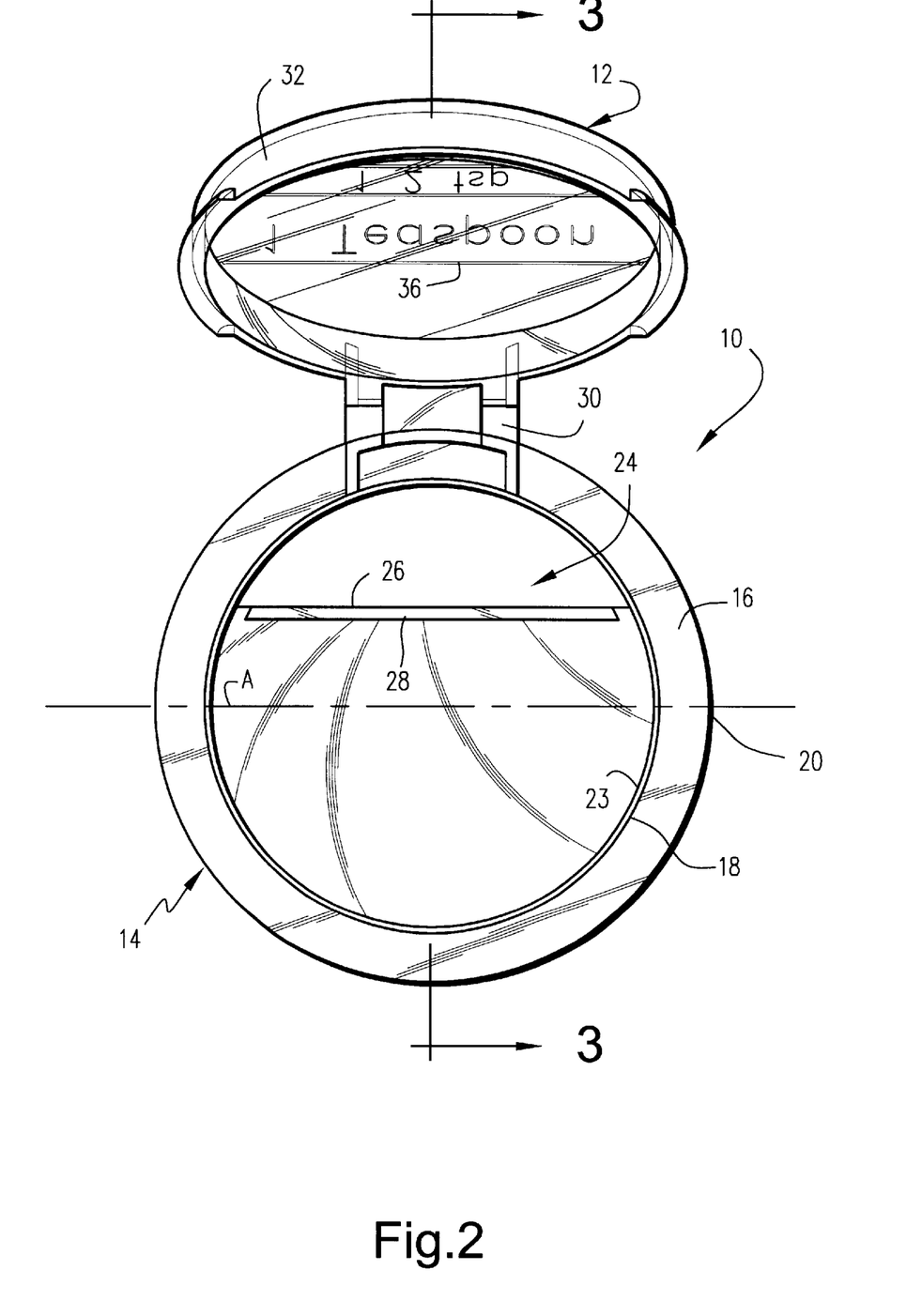
FIG. 2 is a top plan view of the dispensing cap shown in FIG. 1.
Figure 3:
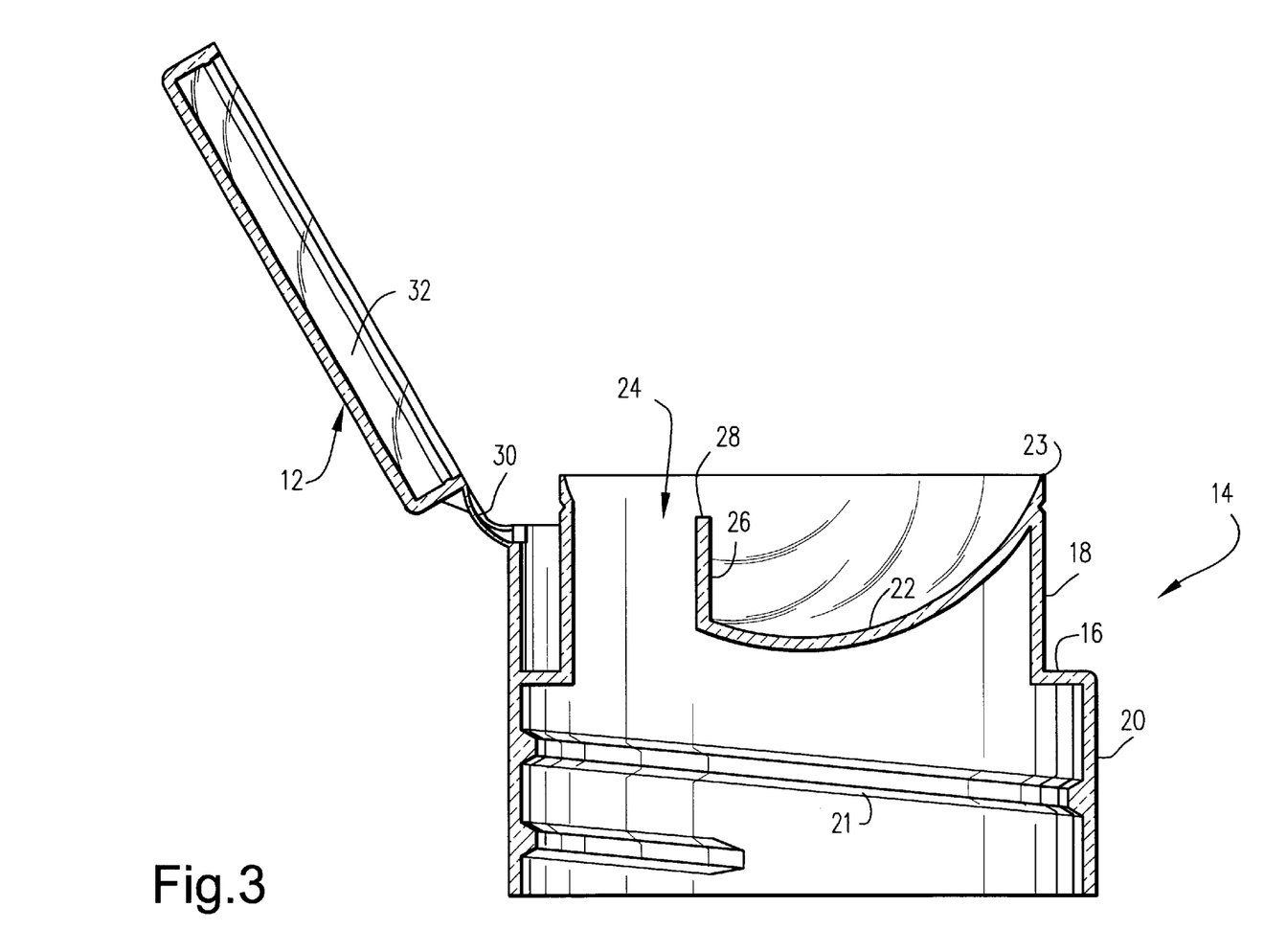
FIG. 3 is a section view of the dispensing cap taken along line 3—3 in FIG. 2.

With reference now to FIGS. 1–3, the measuring/dispensing cap 10 includes a top or cover 12 and a depending skirt portion 14. The depending skirt portion includes an annular radial shoulder 16 separating an upper cylindrical portion 18 from a lower cylindrical portion 20 with an internal screw thread 21 (FIG. 3) adapted to cooperate with an external thread on the upstanding dispensing portion of a container or a jar (not shown) in the manner of a typical threaded closure. Substantially all of the upper portion of the dispensing cap, i.e., above shoulder 16, defines a volumetric space or measuring chamber C from which measured amounts of contents can be dispensed as described in greater detail below. The measuring chamber C is defined by the cap top wall/dispensing door 12, and a generally bowl-shaped (or part-spherical) weir panel 22 which may be integrally formed with the cap, the upper edge of the panel 22 merging with the upper edge 23 of the skirt portion 14 of the cap. The weir panel 22, in cooperation with the inner surface of upper skirt portion 18, forms a dispensing or weir opening 24. The opening 24 is also partially defined by a vertical wall 26 extending along a chordal edge, i.e., wall 26 traces a "chord" vis-a-vis the diameter of the skirt portion 18. The wall 26 lies to the aperture side of a diametrical center line A (FIG. 2) extending across the cap, i.e., the aperture is spaced from that center line, i.e., it is closer to the lid hinge 30, thereby enabling the weir panel to effectively perform a dam function as also described in greater detail below. The vertical wall 26 has an upper edge 28 that lies slightly below the upper edge of the skirt so that with the cap 12 closed, there is an open space or slot through which contents can be poured from the container into the chamber C. The wall 26 serves as a backflow prevention mechanism in that, once a measured amount of container contents has been transferred to the measuring chamber C, it impedes any accidental backflow of contents into the container.

The dispensing door for the cap in this exemplary embodiment includes the entire top wall or cover 12 which is pivotally secured to the depending skirt 14 by an integral hinge 30 on the periphery of the lid. The dispensing door is formed with a peripheral rim 32 which is designed to telescope over the upper edge 15 of the depending skirt portion 14 and to seat on an annular radial shoulder 34. It will be appreciated, however, that the dispensing door 12 and the upper edge 15 of the cap depending skirt portion 14 may be provided with cooperating snap elements or other releasable locking means to hole the dispensing door in a closed position when not in use. The dispensing door is also provided with volume gradations 36 which may, if desired, continue along adjacent portions of the depending skirt 14.

In use, with the cap 12 closed, the user tilts the container (with the portion of the cap diametrically opposite the hinge 30 down) until contents spill over the weir panel 22, through the weir opening 24, and over the wall 26 into the measuring chamber C, until the desired amount is transferred as indicated by gradations 36. The user can then open the lid 12 and dispense the measured amount, with panel 22 serving as a dam to block additional contents from spilling into the chamber C. At the same time, wall 26 prevents any accidental backflow of contents into the container from the measuring chamber C prior to opening the lid. The wall 26 also allows the user to set the container down in an upright position, without fear that the contents will run back into the container and thus necessitate another measuring step.

Figure 4:
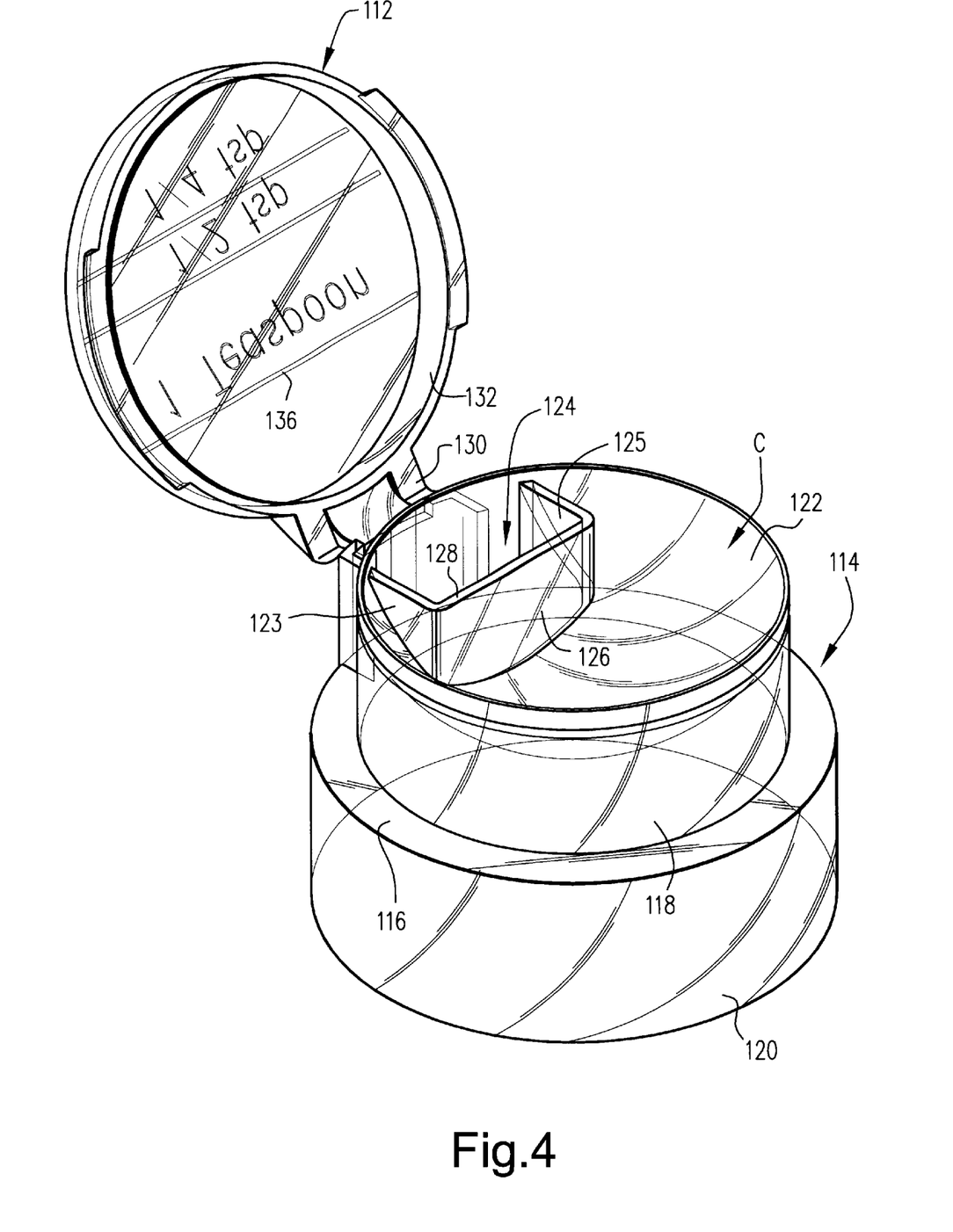
FIG. 4 is a perspective view of a dispensing cap in accordance with an alternative embodiment of the invention.
Figure 5:
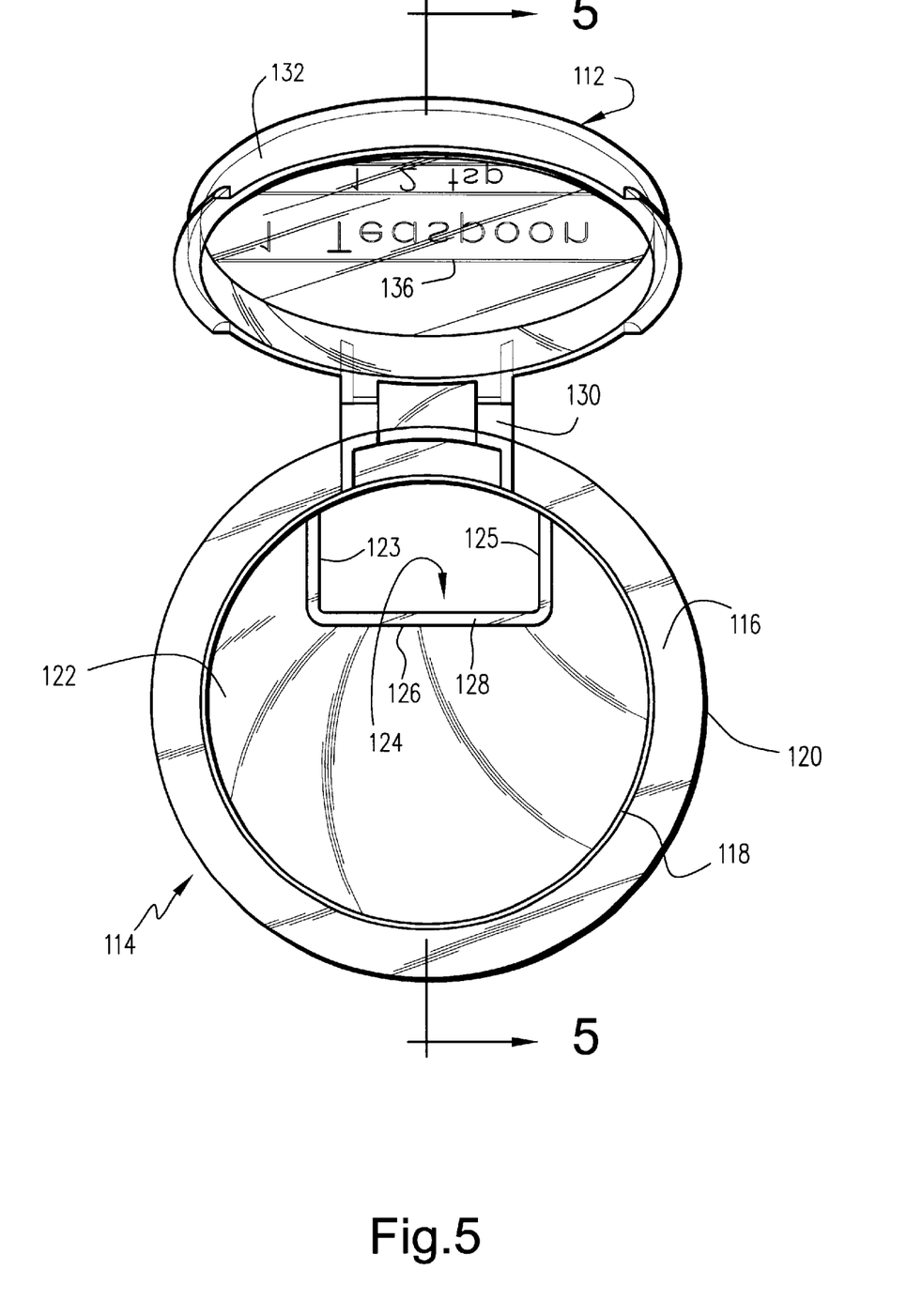
FIG. 5 is a top plan view of the dispensing cap shown in FIG. 4.
Figure 6:
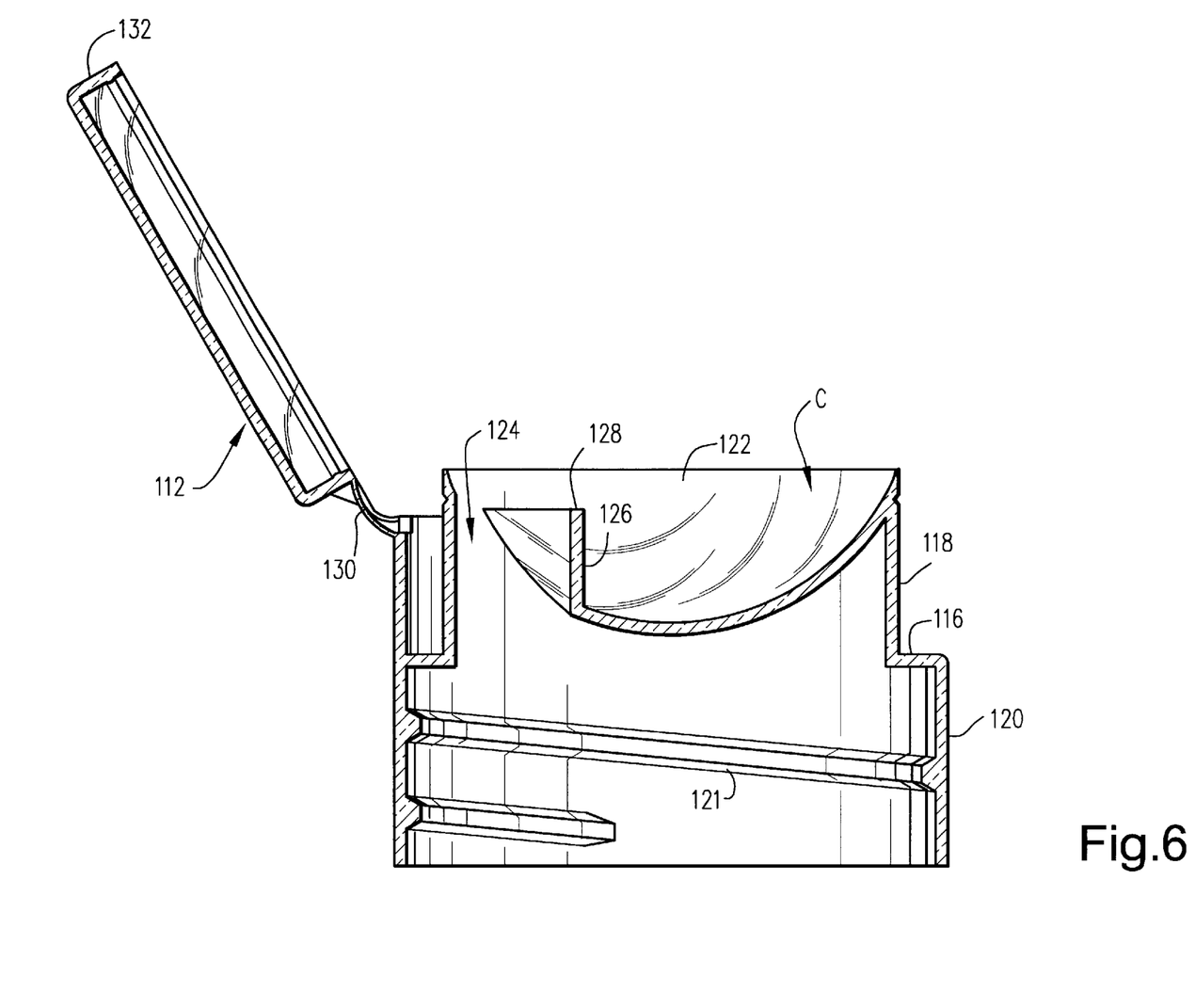
FIG. 6 is a section view of the dispensing cap taken along line 3—3 in FIG. 5.

FIGS. 4–6 illustrate an alternative embodiment where reference numerals similar to those in FIGS. 1–3, but with the prefix "1" added, are used to designate corresponding components. In this embodiment, the weir aperture 124 extends only part way across the weir panel 122 so that the length of wall 126 is shortened relative to wall 26, but also includes side walls 123, 125 that are perpendicular to wall 26. This arrangement reduces the overall size of the opening 124, but the dispensing action and the backflow impedance function provided by walls 126, 123 and 125 are otherwise similar to the embodiment shown in FIGS. 1–3. Here again, the walls 126, 123 and 125 terminate short of the upper edge of skirt portion 118, thus maintaining an opening through which the contents may be transferred to chamber C.

Figure 7:
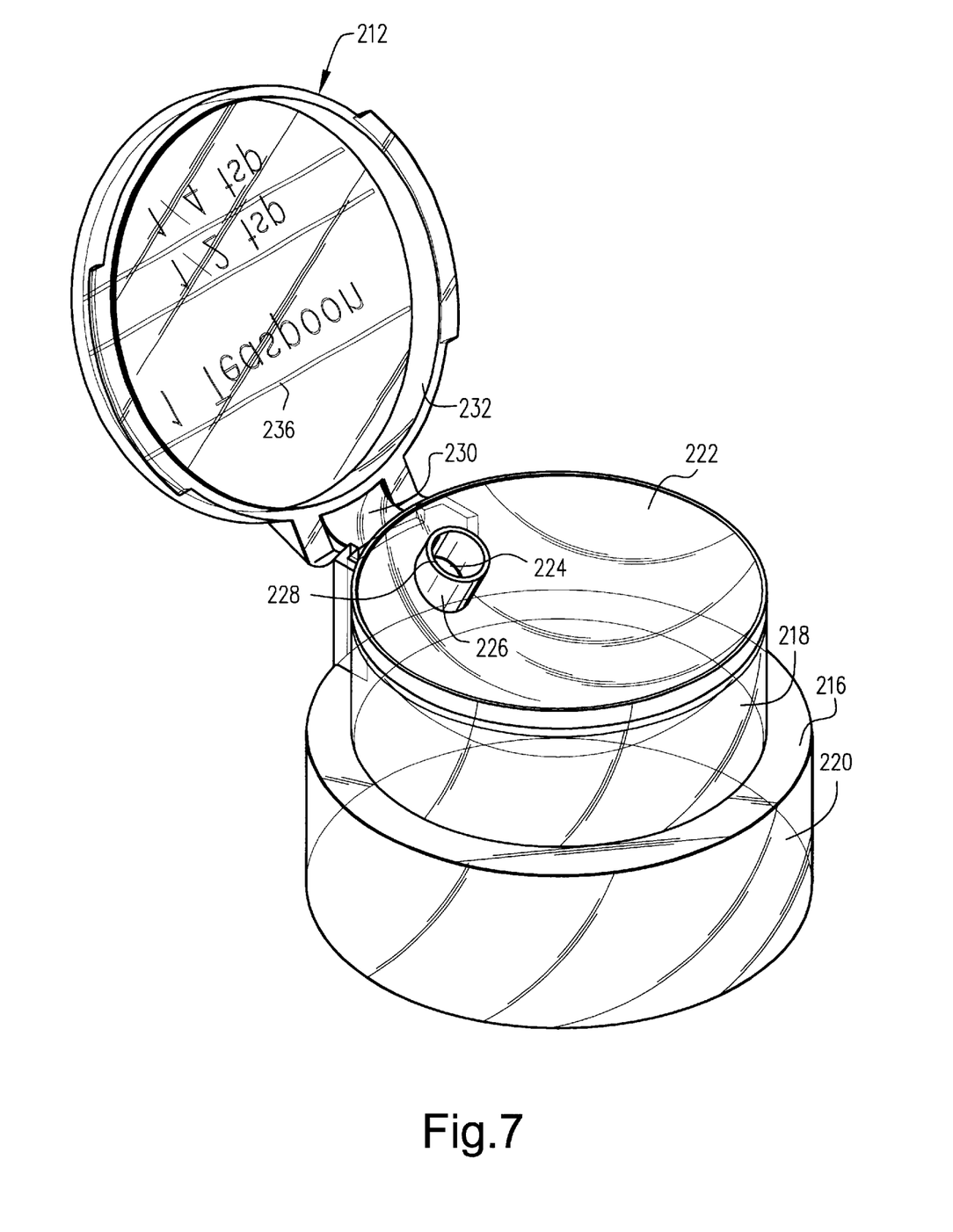
FIG. 7 is a perspective view of a dispensing cap in accordance with a third embodiment of the invention.
Figure 8:
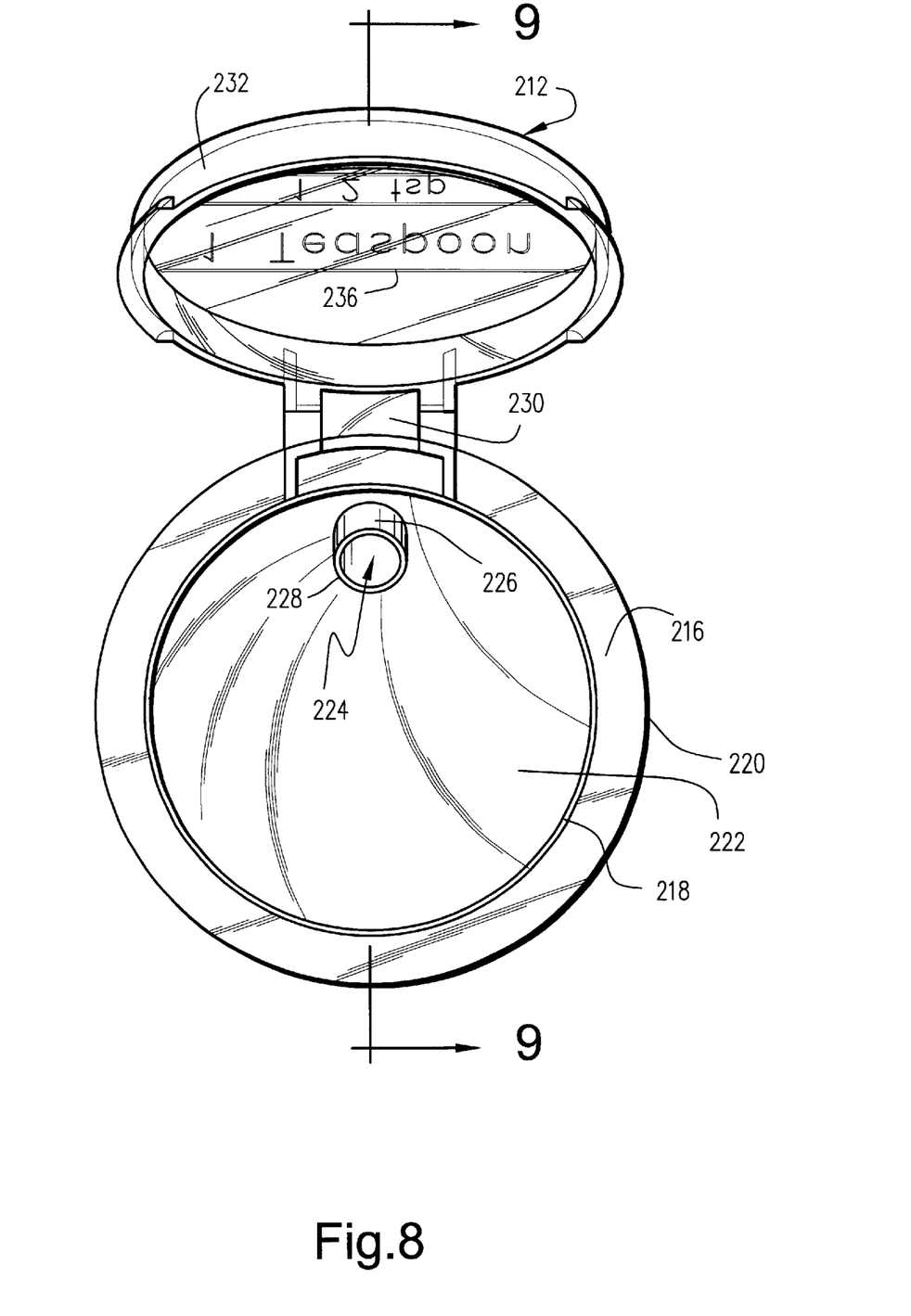
FIG. 8 is a top plan view of the dispensing cap shown in FIG. 7.
Figure 9:
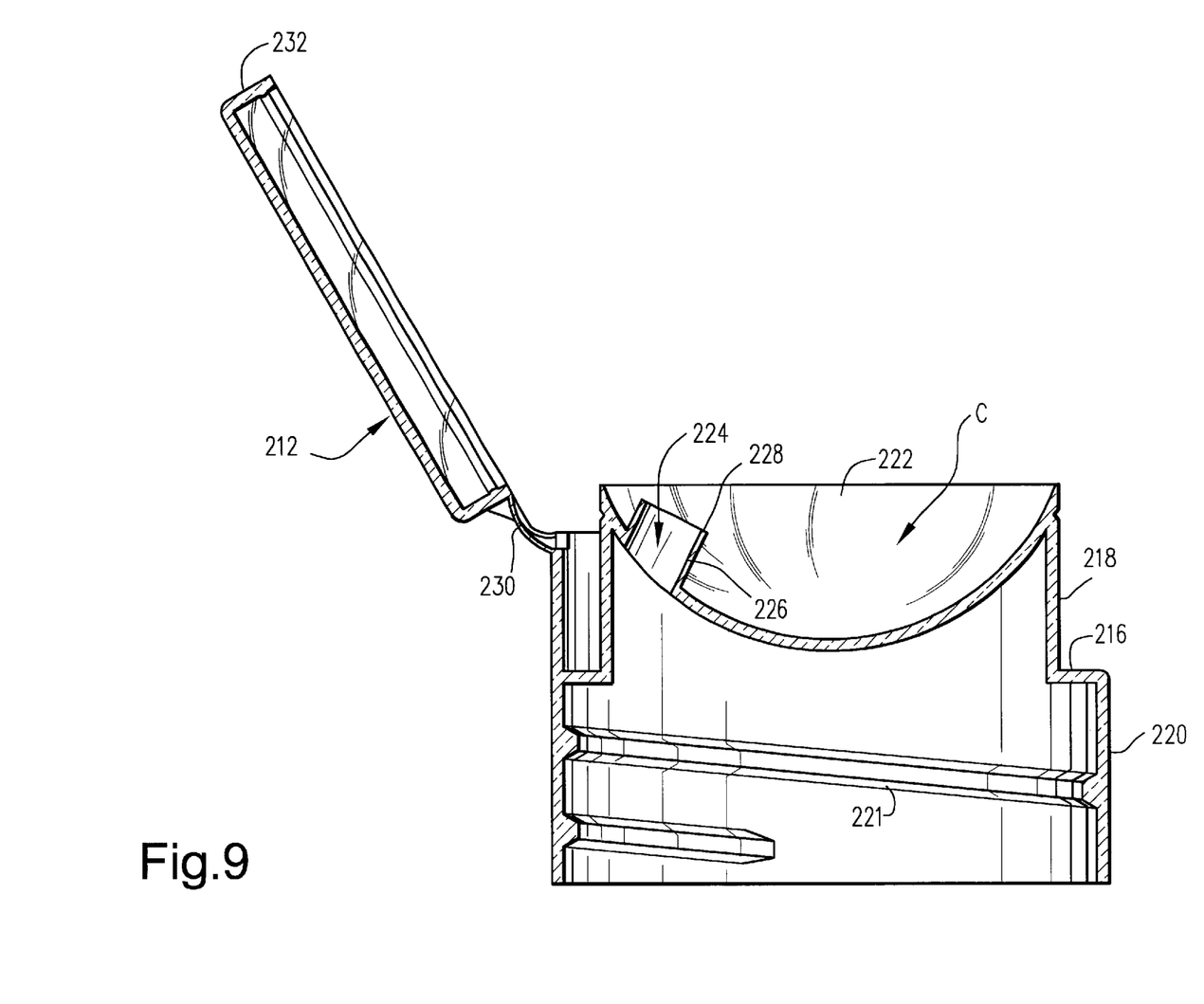
FIG. 9 is a section view of the dispensing cap taken along line 3—3 in FIG. 8.

FIGS. 7–9 illustrate a third embodiment of the invention. For this embodiment, similar reference numerals are used to designate corresponding components in FIGS. 1–3, but with the prefix "2" added. In this embodiment, the weir panel 222 extends about substantially the entirety of the cap interior, with the weir aperture provided in the form of a round hole 224. Backflow prevention is provided by way of a tubular boss or sleeve 226 that surrounds the hole and extends upwardly from panel 222 toward cap 212, again terminating at an edge 228 short of the upper edge of skirt portion to thereby maintain an opening sufficient to permit contents to be transferred from the container to chamber C.

The embodiments in FIGS. 4–6 and 7–9 and operate in substantially the same manner as that in FIGS. 1–3, particularly with respect to the backflow prevention mechanism walls 26, 126 and 226. The principal difference is in the size of the weir openings 24, 124 and 224.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A measuring/dispensing cap adapted for attachment to an open upper end of a container, the cap comprising a substantially cylindrical skirt and a lid connected thereto by a hinge at a location on a periphery of said lid; said cylindrical skirt portion incorporating a measuring chamber defined in part by a weir panel having an opening that is defined in whole or in part by a wall extending upwardly from said panel toward said lid, terminating short of the underside of said lid, said wall located entirely between said hinge and a diametral center line of said cap.

2. The cap of claim 1 wherein said weir opening is defined by a chordal edge across said weir panel, offset from a center of said weir panel, and a curved interior surface of said skirt portion.

3. The cap of claim 1 wherein said weir opening is defined by three straight edges of said panel and a curved interior surface of said skirt portion, and wherein said wall extends upwardly from said three straight edges.

4. The cap of claim 1 wherein said weir opening is defined by a round hole in said weir panel and wherein said vertical wall is in the form of a tubular sleeve extending upwardly from said round hole.

5. The cap of claim 2 wherein said lid is integrally connected to said cap by a hinge, and wherein said chordal edge lies closer to said hinge.

6. The cap of claim 1 including volumetric gradations on said lid.

7. The cap of claim 1 wherein at least said lid is composed of substantially transparent plastic.

8. The cap of claim 1 wherein said vertical wall terminates short of an upper edge of said skirt portion.

9. The cap of claim 1 wherein said skirt portion is formed with an internal thread to enable attachment of the cap to a container.

10. A measuring/dispensing cap adapted for attachment to an open upper end of a container, the cap comprising a substantially cylindrical skirt and a lid connected to said cap by a hinge; said cylindrical skirt incorporating a measuring chamber defined in part by a generally bowl-shaped weir panel having an opening that is offset from a center of said cap in a direction toward said hinge and is defined in whole or in part by a wall extending upwardly from said panel, terminating short of the underside of said lid; wherein at least said lid is composed of substantially transparent plastic; and wherein said lid is provided with volume indicators.

11. The cap of claim 10 wherein said wall includes a front and two side portions perpendicular to said front portion.

12. The cap of claim 10 wherein said wall comprises a tubular sleeve.

13. The cap of claim 10 wherein said wall is planar and extends along said opening.

* * * * *